US006715223B2

(12) United States Patent
Andrade

(10) Patent No.: US 6,715,223 B2
(45) Date of Patent: Apr. 6, 2004

(54) PROMOTIONAL VIEWING DEVICE

(76) Inventor: Richard Andrade, 17760 Alonzo Pl., Encino, CA (US) 91316

( * ) Notice: Subject to any disclaimer, the term of this patent is extended or adjusted under 35 U.S.C. 154(b) by 0 days.

(21) Appl. No.: 10/135,267

(22) Filed: Apr. 30, 2002

(65) Prior Publication Data

US 2003/0200682 A1 Oct. 30, 2003

(51) Int. Cl.[7] .............................................. G02B 27/02

(52) U.S. Cl. .......................... 40/364; 40/472; 352/126; 352/129

(58) Field of Search .......................... 40/364, 363, 362, 40/366, 472, 524, 525; 352/129, 126, 127

(56) References Cited

U.S. PATENT DOCUMENTS 2,071,120 A * 2/1937 Harlow ....................... 352/129
2,449,699 A * 9/1948 Higgins ....................... 40/364
2,485,411 A * 10/1949 Pratt et al. .................. 352/129
3,104,483 A * 9/1963 Thompson et al. ........... 40/364
3,265,457 A * 8/1966 Dale .......................... 352/129
5,311,356 A * 5/1994 Freilich ...................... 359/467

* cited by examiner

*Primary Examiner*—Gary Hoge
(74) *Attorney, Agent, or Firm*—I. Michael Bak-Boychuk

(57) ABSTRACT

A promotional viewer includes a generally rectangular housing which can be engaged to an enclosure containing a recorded entertainment piece, or may be formed as an integral part thereof. The front surface of the viewer is provided with viewing apertures aligned over a portion of a continuous film loop mounted on turning rollers within the housing and illuminated by ambient light collected by a mirror in a lateral opening in the housing. To shield the other ambient illumination paths each of the viewing apertures may be provided with erectable shields.

13 Claims, 5 Drawing Sheets

PROMOTIONAL VIEWING DEVICE

BACKGROUND OF THE INVENTION

1. Field of the Invention

The present invention relates to advertising devices, and more particularly to viewing structures that are deployable from the packaging exterior of a vended article to provide manually selectable visual images to the prospective purchaser.

2. Description of the Prior Art

The promotion and advertising of movies and videotaped musical performances is a robust and vigorous competitive endeavor, particularly in light of the large financial investments in the production thereof Most often these endeavors select for display over public media parts or portions of the entertainment piece, i.e., a movie or musical performance, and it is this promotion process that represents the major component of all advertising costs. This part of an advertising campaign, however, competes for public attention with the program matter then carried on the public channel and is therefore inherently limited. As an adjunct thereto, or even as an alternative, further advertising scheme are devised in which selected parts or portions of a movie or performance are imbedded as leaders (or sometimes trailers) displayed along with a primary rendition of another entertainment event. In each instance the advertising message is inextricably tied to the hosting event and is thus fixed to a particular audience.

Recently there has been a veritable avalanche of new technologies which dramatically changed the entertainment venue. Most of the entertainment market today is in the form of vendable articles like video discs, video cassettes, or even audio cassettes that are bought and then brought to the home of the viewer. In each instance various storage and handling concerns have dictated a relatively small, standardized package which is either directly inserted into the playing device or which houses the disc that is then inserted into the drive mechanism of the player. This small packaging surface leaves little space for advertising copy and as a result various techniques have been devised which, in one way or another, seek to render convenient individual inspection and perusal of selected scenes from the music video or movie that is offered for sale. Most often these techniques follow the path set in disc storage technology where various sectors on the disc are rendered accessible to be searched by the patron, as for example the systems described in U.S. Pat. No. RE32, 115 issued to Lockwood, et al.; U.S. Pat. No. 5,970,471 issued to Hill; and others. While suitable for the purposes intended this review process requires multiple viewing stations where the store patron can insert the disc or cartridge and review the advertising segments thereof, a costly proposition for a busy selling enterprise.

Advertising by selected segment exposure, moreover, has particular limitations in the entertainment business where the interests of marketing invariably compete with the limits of over-exposure. Simply, an entertainment product that is over-exposed during its marketing leaves little incentive for its eventual purchase and the advertiser, therefore, needs to select such alternative attention garnering means that do not compromise the story line nor disclose the whole of the musical rendition. Within these constraints the promoter or advertiser of films and videos engages in the very robust contest for the entertainment market share. In the past this narrow band was accommodated by the print industry, with large posters advertising selected images or scenes from the movie or musical rendition. As noted above, the major component of the current entertainment market has found its way onto small devices like a video cassette, a video disc or even a tape cartridge, often vended from racks or shelves with little space for print advertising. In consequence various alternative public relations devices followed to gain the proverbial eye level shelf space to one or another tape or disc, or to otherwise draw the attention of the customer to a particular entertainment product. Amongst these are other discs or cartridges that include promotional messages, like those exemplified above, or trailers on other entertainment products inviting the consumer to the next selection.

Video discs and tape cartridges are currently vended in standardized enclosures with little differentiation in their stacked or shelved exterior that can be utilized to garner attention. Moreover, even when a particular video disc or tape cartridge are found by the customer the small exterior dimensions of the packaging thereof leave little space for any information. A vigorous promoter is thus left with few mechanisms in his arsenal to advertise the entertainment product other than those that over-expose and thus compromise the product. Alternatives are therefore sought which allow viewing focus on some of the collateral aspects of the product like scene detail, historic background and other information that garners the customer's interest without disclosing the whole of the piece.

In the past various viewing devices have been developed which in one way or another transport a continuous film strip across one or more viewing apertures. Examples of such viewing devices can be found in the teachings of U.S. Pat. No. 3,706,439 issued to Skinner et al., 4,591,238 issued to Kitaoka et al., U.S. Pat. No. 5,800,034 issued to Hoyt et al., and others. While suitable for the purposes intended each of the foregoing examples discloses a fairly cumbersome structure that does not lend itself for convenient adjunct deployment on a cartridge or disc case and which, moreover, are all of substantial complexity and therefore too costly for use as an advertising device. An inexpensive, collapsible viewing device useful as an attachment on the case or cartridge is therefore extensively sought and it is one such device that is disclosed herein.

SUMMARY OF THE INVENTION

Accordingly, it is the general purpose and object of the present invention to provide a collapsible viewing attachment that is conveniently stored on the exterior of a cassette or disc case.

Other objects of the invention are to provide a collapsible viewing device for deploying a continuous film loop in a stereoscopic viewing presentation.

Further objects of the invention are to provide an advertisement viewer attachable to a VHS cartridge or video disc case which is deployed along the edges thereof to retain the original storage dimensions.

Yet further objects of the invention are to provide a manually advanced viewer which is easy to produce, requires few parts and is therefore both reliable and inexpensive.

Briefly, these and other objects are accomplished within the present invention by providing a continuous film loop viewing assembly in which the film loop is transported by manually advanced rollers across a pair of viewing apertures. The film loop and the rollers are enclosed in a rectangular housing which also includes the apertures in one edge thereof Also included in the housing is a mirror structure which collects and directs the ambient lighting to the film frames subjacent the viewing apertures. In the first implementation the housing is dimensioned for engagement to the end edge of a VHS video tape cartridge and in its second form the viewer housing is pivoted from a stored position within a video or laser disc case to an alignment exterior thereto exposed for viewing. In both instances the inventive viewer is useful to display stereoscopic images to the prospective customer which either inform about the matter stored on the tape or disc or display other advertising information.

The foregoing mechanism is rendered particularly useful for promotional efforts by the very nature of its construction. Specifically, both forms of the inventive viewing assembly may utilize inexpensive material structures like a thin polymer sheet or cardboard to form the primary structure, the sheet material being folded and joined into a relatively narrow rectangular housing of a height generally equal to that of the cassette or disc case, the narrow edge dimensions of this structure then providing the surface through which the viewing apertures are formed. This narrow edge viewing surface is then expanded by unfolding shielding extensions that obscure background light formed in the folded surfaces adjacent each aperture, each aperture surface and also its adjacent shielding extensions comprising a dished or dimpled common surface which is upset across the folds in the course of the deployment of the shields defined by an arc segment cut in the adjacent panels. Thus in the stored position the shielding extensions are upset biased to align with the adjacent housing surface to be only unfolded therefrom for viewing.

The continuous film loop is then stretched underneath the apertures between the two manually advanced rollers to align correspondingly spaced image frame pairs for viewing. Each of these frames is backlit by a light collecting mirror within the housing which is exposed to ambient light through an exterior opening formed in the top surface of the housing. This back lighting, together with a dark non-reflective coloring of the surfaces adjacent each aperture, provide the necessary contrast and illumination for effective image viewing. Of course, stereoscopic depth imaging may be included in the image pairs to provide the further attention garnering inducement to the viewer. Accordingly, an inexpensive viewing structure is devised that can be engaged to the end of a cartridge or that is hinged from a stored position adjacent an interior edge of a disc case which is then useful in garnering the attention and interest of prospective customers. This interest garnering is effected by still images which therefore do not compromise the story line or theme of the entertainment product that is stored on the associated tape or disc.

It should be noted that the foregoing stereoscopic image presentation is illustrative only. For those instances where the information content predominates, single frame viewing can be effected by displacing the viewed film loop segment to the viewing focus of a set of lenses installed in each aperture. Moreover, compression of the vertical dimension can be achieved by inclining the viewed film portion over inclined rollers. Thus both a wide range of message densities can be accommodated as is a wide range of vended packaging dimensions, in an article that is both inexpensive and effective as a promotional device. In further adaptation the inventive viewer may be simply formed as an extension of any enclosure containing a record medium, to be inspected and utilized as a part of the purchase selection process.

DESCRIPTION OF THE PREFERRED EMBODIMENTS

Figure 1:
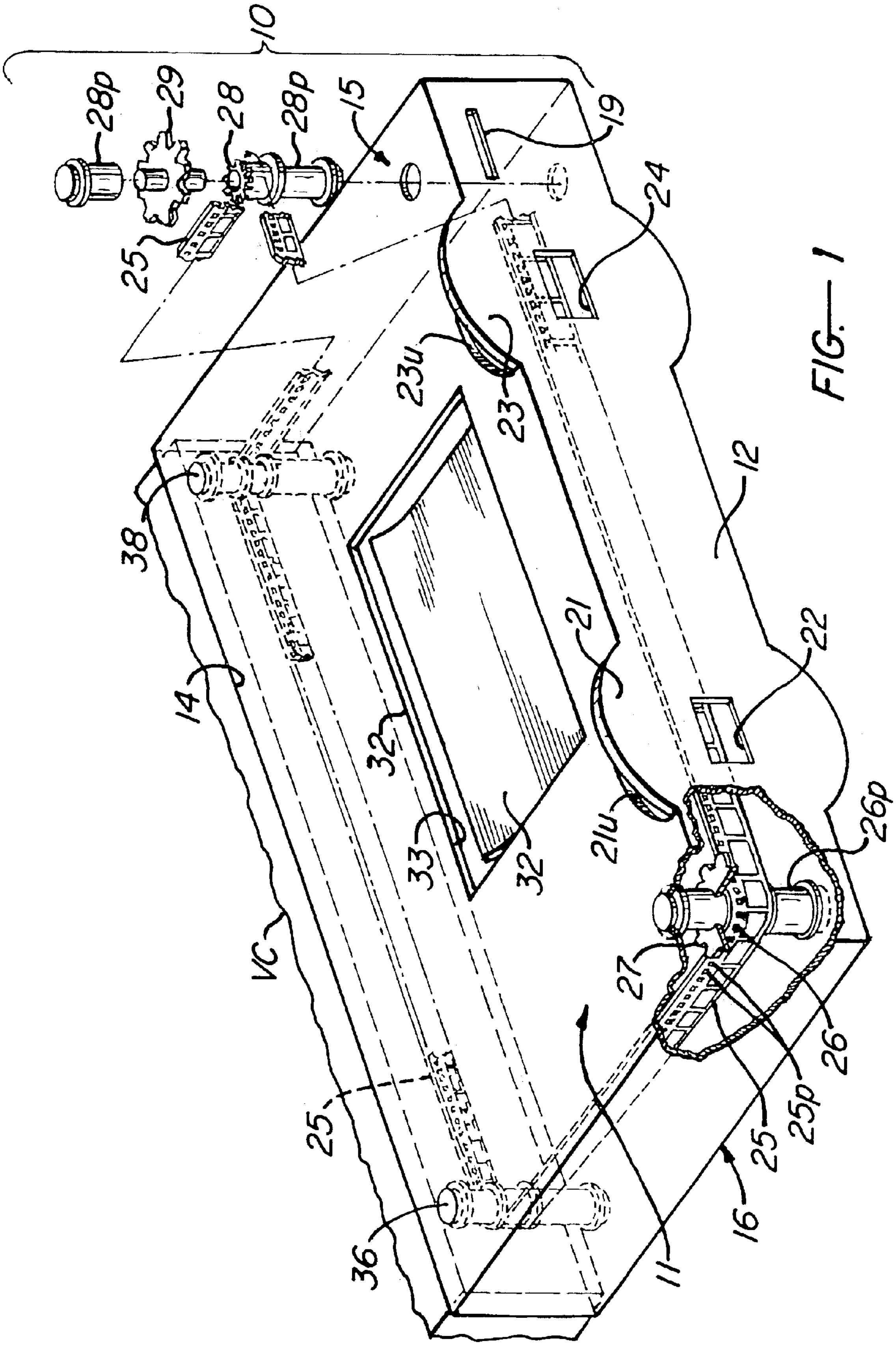
FIG. 1 is a perspective illustration, separated by parts, of a first implementation of the inventive viewing assembly conformed for attachment to one end edge of a cassette.
Figure 2:
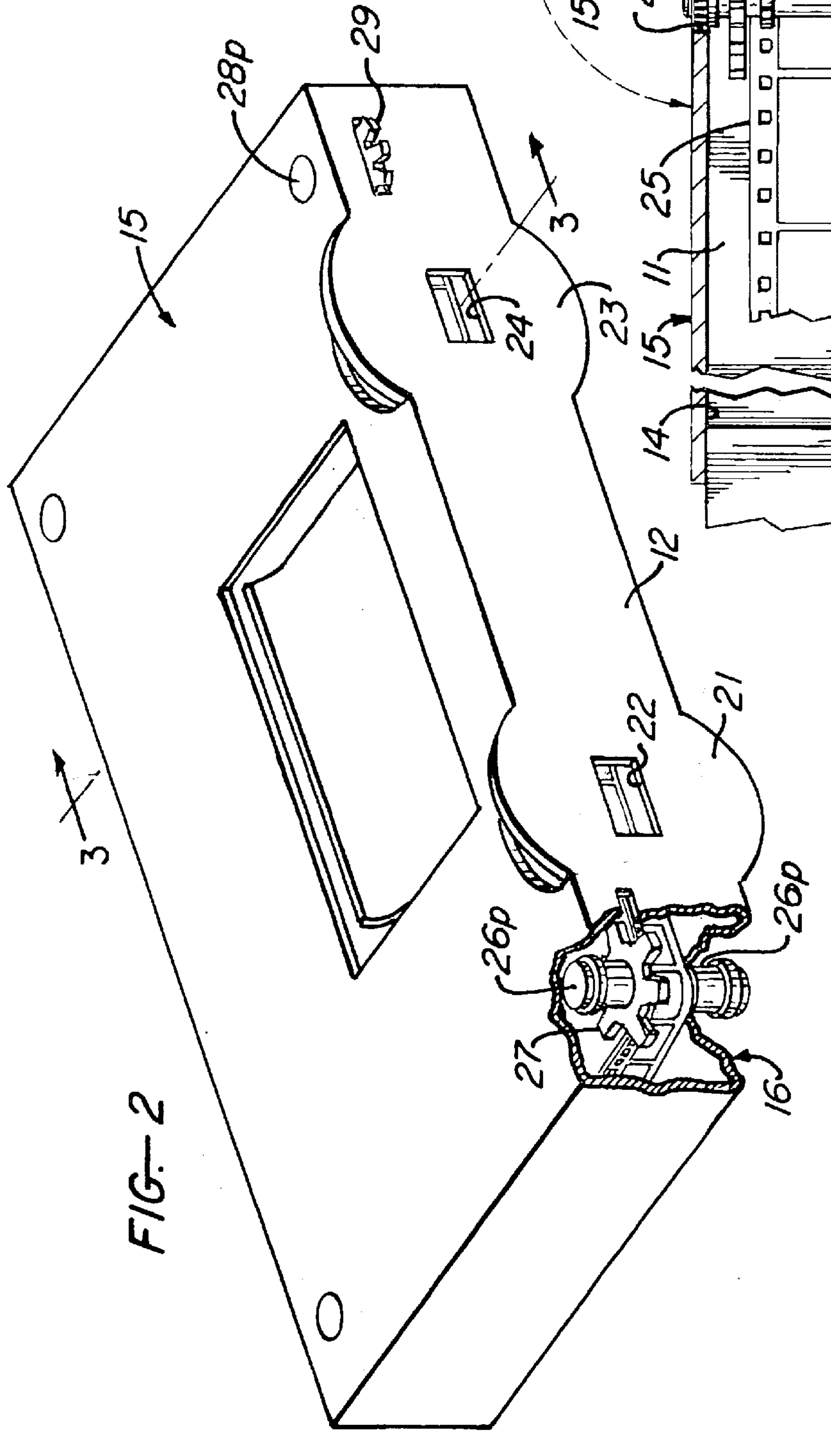
FIG. 2 is a further perspective illustration of the inventive viewing assembly shown in FIG. 1, in partial cut out to illustrate the interior components thereof.
Figure 3:
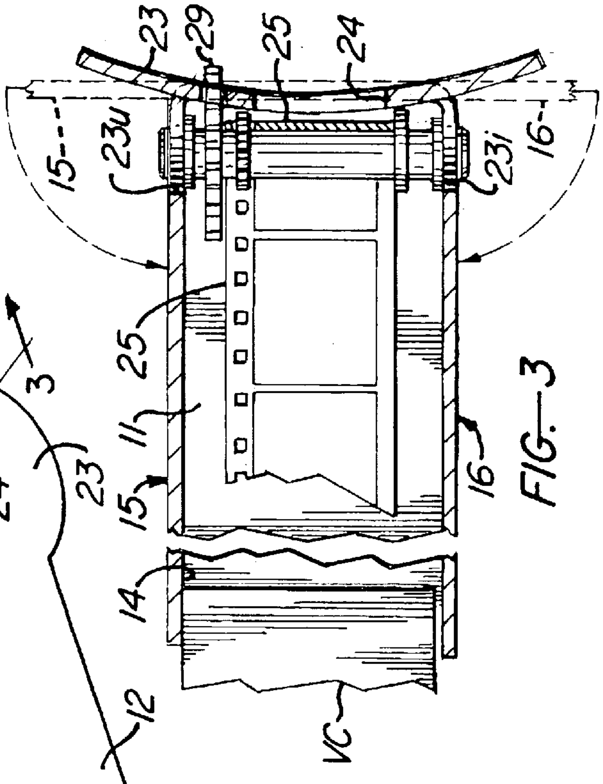
FIG. 3 is a sectional view taken along line 3—3 of FIG. 2.

As shown in FIGS. 1 through 3, the first implementation of the inventive viewing assembly, generally designated by the numeral 10, includes a rectangular hollow housing 11 defined by a front surface 12 and an opposite rear opening 14. Preferably housing 11 is formed by folding and joining a stiff sheet material surface, like cardboard or a stiff polymer sheet, into a rectangular shape defined by an upper and lower panels 15 and 16 providing an interior cavity of a sectional dimension conformed to receive in mating fit one end of a video cassette VC in its rear opening 14. In this form housing 11 projects as an extension from the cassette end, retaining most of the storage dimensions thereof and therefore its original vending convenience. Within these dimensional constraints the front surface 12 is pierced with a pair of viewing apertures 22 and 24 spaced relative each other by the mean anatomical spacing of ocular structure, each of the apertures 22 and 24 residing within corresponding surface depressions 21 and 23 which further extend onto the adjacent areas of panels 15 and 16. Thus each of the deformations 21 and 23 extend across the fold lines at the juncture of the front surface 12 and the upper and lower panels 15 and 16, the deformations developing upsetting internal forces as result of the folding. These internal upsetting forces are wholly resolved within each of the depressions by way of arcuate relief cuts 21*u*, 21*l*, 23*u* and 231 in the upper and lower surfaces 15 and 16 whereby the free portions of depressions 21 and 23 are either turned into surfaces 15 and 16 or are erected into a common shielding dish around each aperture. In this manner an erectable shield is provided around each aperture to block most of the ambient lighting, thereby enhancing the viewing convenience of the device. To further improve these shielding aspects the exposed surface of each depression may be coated with dark, non-reflecting coating.

A continuous film loop 25 is then extended behind the front surface 12 in alignment subjacent both the viewing apertures 22 and 24, the film loop being selected from one of the narrow film standards like 8 millimeter film typically provided with at least one row of spaced perforations 25*p* along the edges thereof A set of advancing rollers 26 and 28 are mounted for rotation within housing 11, each aligned distally of the corresponding apertures 22 and 24 and each including a sprocket ring 27 and 29 engaging perforations 25*p*. Preferably rollers 26 and 28 are each mounted on corresponding pivot pins 26*p* and 28*p* extending through the upper and lower panels 15 and 16 deploying the rollers adjacent the front surface 12 with the film loop 25 captured therebetween and the sprocket rings 27 and 29 extending through slots 17 and 19 formed in the viewing surface 12 to the housing exterior to be exposed thereat for manipulation. Another pair of turning rollers 36 and 38 are then installed for rotation within housing 11 to guide the film loop 25 around a light collecting mirror 32 mounted in the housing below a light admitting opening 33 formed in the upper panel 15. Thus an inexpensive viewing assembly is devised in which a film loop is manually advanced across shielded viewing apertures that are back lighted by ambient lighting.

Figure 4:
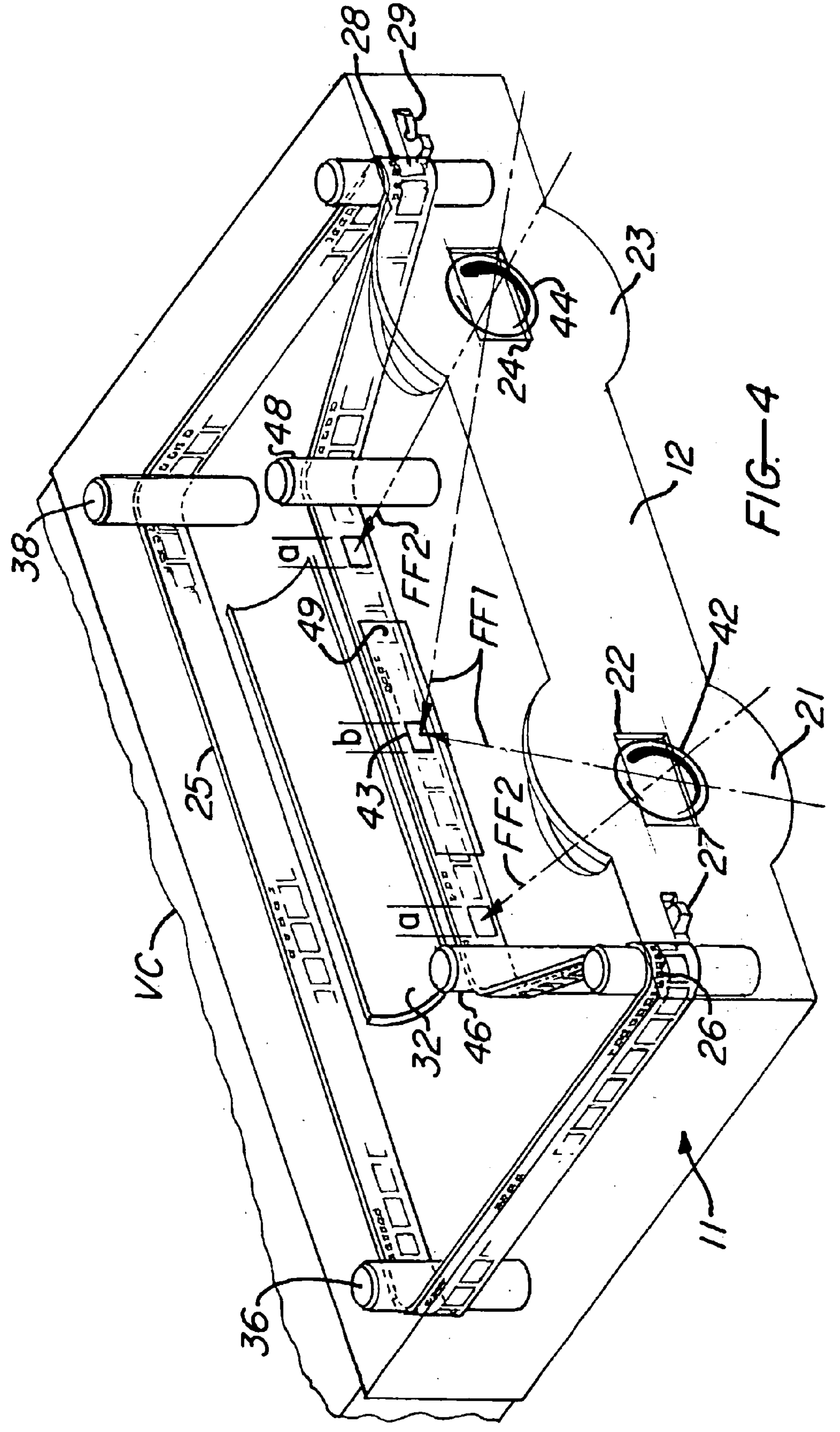
FIG. 4 is a further perspective illustration, in partial section, of an alternative film viewing alignment useful with the inventive assembly shown in FIGS. 1–3.

Those in the art will appreciate that the foregoing structure is particularly useful for displaying stereoscopic images, with the frames on film loop 25 arranged in paired sets separated by the spacing between apertures 22 and 24. Should, however, more information content be desired the film loop 25 may be guided away from the apertures in the manner illustrated in FIG. 4. Like numbered parts functioning in a like manner to that previously set out, a further set of turning rollers 46 and 48 is provided within housing 11 directing film loop 25 away from the front panel 12 to a point just adjacent mirror 32. At the same time both the apertures 22 and 24 are provided with corresponding optical lenses 42 and 44 having the respective foci FF1 and FF2 thereof aligned towards the center of a single frame opening 43 formed in a shielding panel 49 spanning the gap between rollers 46 and 48. Thus only a single frame is advanced into the field of viewing focus, effectively doubling the information content on the film loop 25.

It will be appreciated that the foregoing structure, in both of its viewing implementations, is adapted to be formed as a part of, or as an engaged extension mounted directly to the packaging exterior of the video cassette cartridge VC and is therefore physically apparent as a source of visual promotion material concerning the entertainment product. Where the entertainment product is notable for its scene detail or three dimensional images the stereoscopic viewing arrangement is particularly useful. Alternatively, the single frame format can be utilized to increase the information content of the promotional message. Thus the expedience of single frame or stereoscopic viewing allows for a wide range of options, increasing the utility of the inventive assembly.

Figure 5:
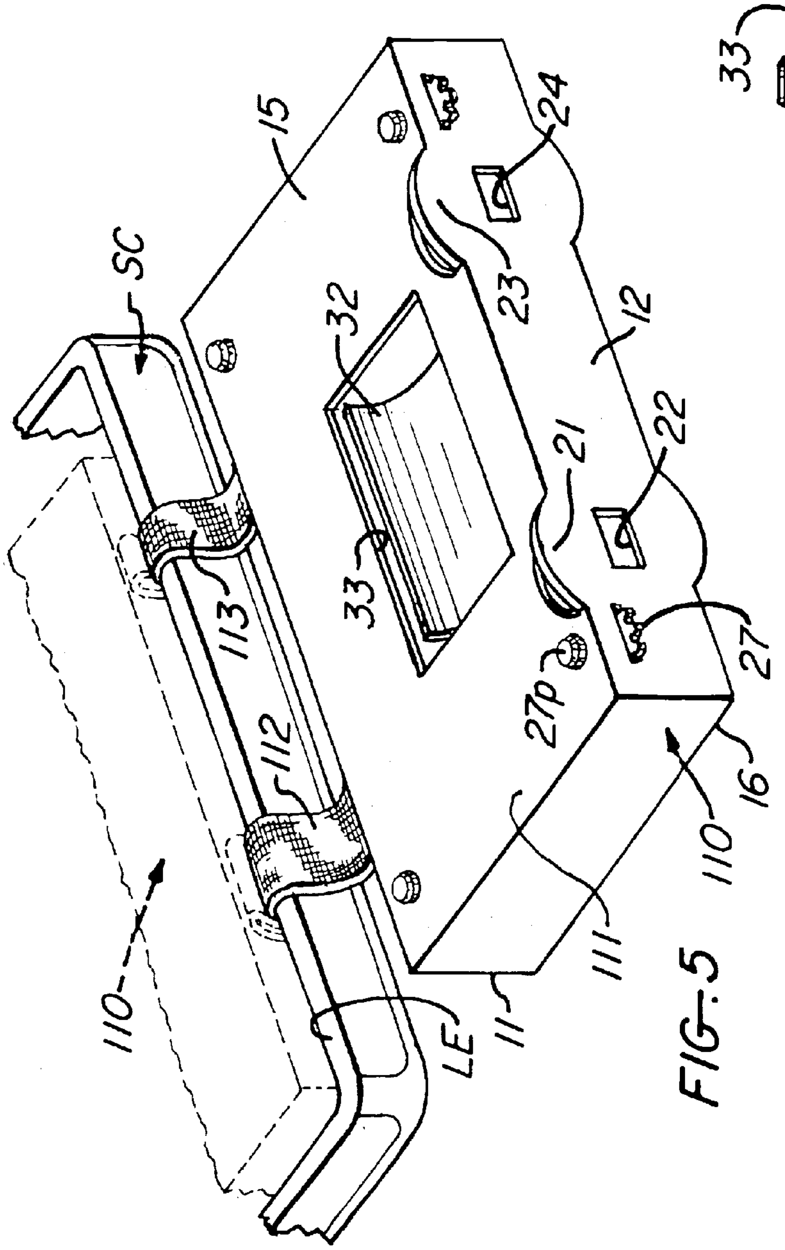
FIG. 5 is a side view illustrating the deployment sequence of the viewing assembly illustrated in FIG. 4.
Figure 6:
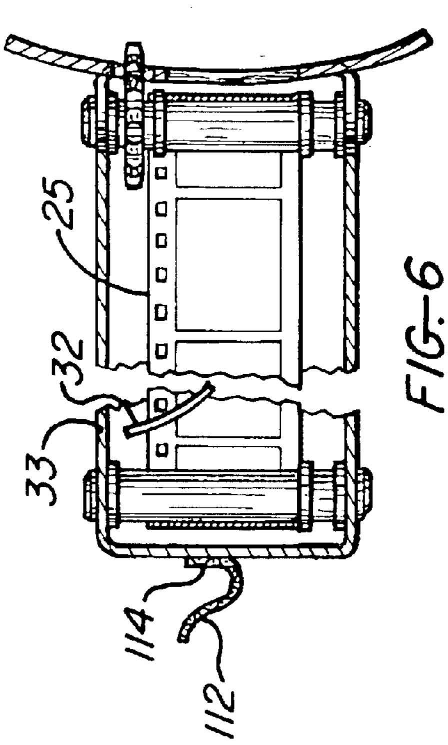
FIG. 6 is a sectional detail view of the manual advancement mechanism useful with the inventive viewing assembly shown in FIGS. 4 and 5.

To further expand the useful range of the inventive structure, including attachment thereof to the substantially narrower laser disc or video disc cases, an alternative implementation is shown by reference to FIGS. 5 and 6 in which the second form of the inventive viewing assembly, generally designated by the numeral 110, is contained in a housing 111 sized to fit along the interior lower edge LE of a disc storage case SC where it is secured by a pair of flexible strips 112 and 113 extending from the housing rear surface 114 to adhesively bonded points on the edge LE. Preferably, the free length of strips 112 and 113 is sufficient to allow for the pivotal deployment of the housing 111 to the exterior of the case SC allowing any prospective purchaser to examine the images that may be displayed in the housing. To effect such perusal of images in a manner similar to the implementation described above, housing 111 is again provided with a like numbered structure to that previously described, including the front surface 12 in which the viewing apertures 22 and 24 are formed within surface depressions 21 and 23 that extend across the housing folds onto the upper and lower panels 15 and 16. A continuous film loop 25 is once again extended between the advancement rollers 26 and 28 across the viewing apertures in the manner earlier described, the film loop being again engaged to the film by sprockets 27 and 29. In accordance with the prior description the film loop 25 may be turned over the turning rollers 36 and 38, around the light collecting mirror, to provide a stereoscopic display, or may be looped to a single frame presentation in the manner shown in FIG. 4 (not fully illustrated).

Figure 7:
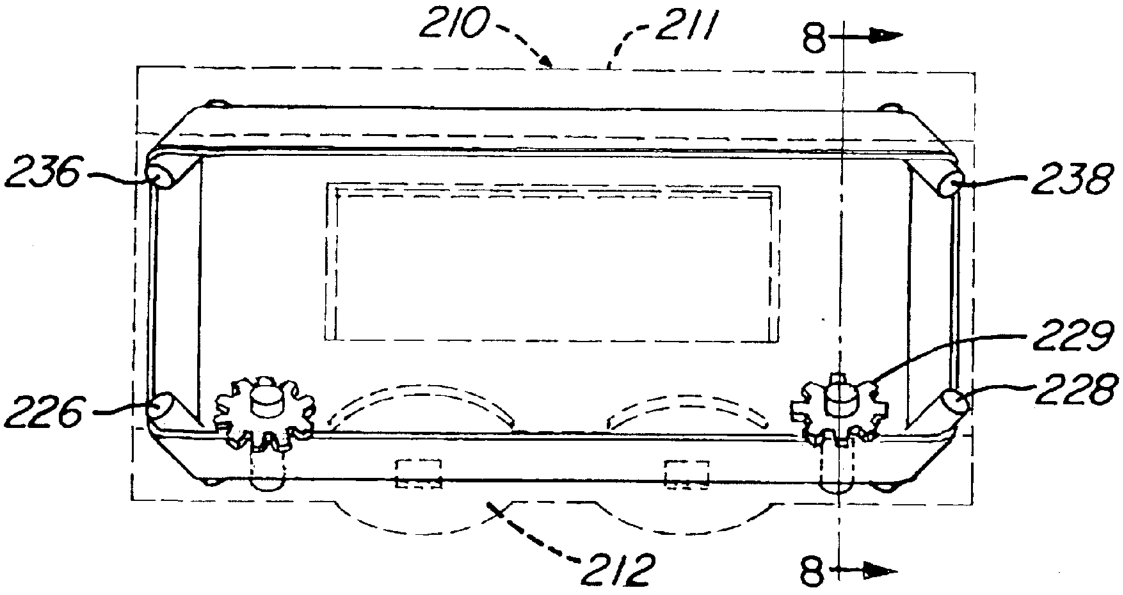
FIG. 7 is a perspective illustration of a further continuous film loop deployment useful with the invention herein.
Figure 8:
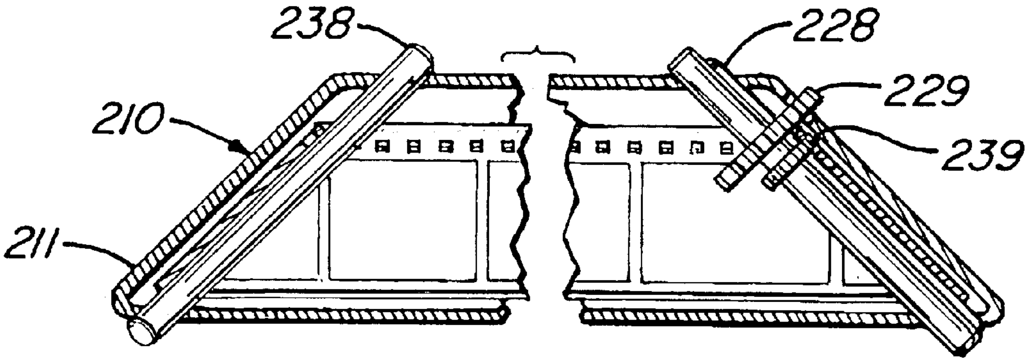
FIG. 8 is a sectional view taken along line 8—8 of FIG. 7.

Thus as described above the vended form of the inventive viewing assembly may be varied to accommodate the form and content of the prospective images thereon. Similar provisions are available to vary the over-all thickness of the assembly, by particular reference to FIGS. 7 and 8. In this instance a viewing assembly designated by the numeral 210 includes a set of inclined turning rollers 226, 228, 236 and 238 deployed within the housing 211, with the front rollers 226 and 228 respectively provided with sprockets 237 and 239 that both capture the film perforations and are also exposed for manual advancement. The inclination of the rollers allows for an inclined presentation of the film loop segment subjacent the front surface 212 which is therefore inclined, reducing the thickness of the resulting package. Of course, the several arrangements of the remaining part of the film loop can be similarly achieved, accommodating both single frame and stereoscopic presentation. In this manner storage cases of various thicknesses can be accommodated.

These several structures therefore accommodate the several packaging forms that are now utilized in vending entertainment product, each of the structures being easily achieved in an inexpensive implementation that is particularly suitable for promotional use. Obviously, many modifications and variations can be effected without departing from the spirit of the invention instantly disclosed. It is therefore intended that the scope of the invention be determined solely by the claims appended hereto.

What is claimed is:

1. A viewing assembly deployable on an entertainment record enclosure and useful in displaying promotional information associated with said entertainment record, comprising:

a generally rectangular hollow housing defined by an elongate front surface deployed between an upper and a lower surface cooperatively dimensioned to form an extension for said enclosure;

a pair of viewing apertures formed in said front surface, each said aperture including a corresponding erectable shield formed thereabout comprising in parts thereof adjacent portions of said upper and lower surface;

a film loop deployed within the interior of said housing supported on a plurality of turning rollers mounted for rotation between said upper and lower surface to extend a selected portion of said film loop subjacent said apertures, selected ones of said rollers including means for manually advancing said film loop; and a light admitting opening provided with a mirror therein for directing ambient light towards said selected portion of said film loop.

2. Apparatus according to claim 1 wherein:

said housing is dimensioned to receive said record enclosure in the interior thereof opposing said front surface.

3. Apparatus according to claim 2 wherein:

said film loop includes paired stereoscopic images separated for alignment with corresponding ones of said apertures.

4. Apparatus according to claim 1 wherein:

said housing is dimensioned for receipt within said enclosure.

5. Apparatus according to claim 4 further comprising:

pivotal connection means connected between said enclosure and said housing for selective deployment of said housing on the exterior of said enclosure.

6. Apparatus according to claim 5 wherein:

said film loop includes paired stereoscopic images separated for alignment with corresponding ones of said apertures.

7. A viewing assembly useful in displaying promotional information comprising:

a hollow housing defined by an elongate front surface deployed between an upper and a lower surface;

a first viewing aperture formed in said front surface;

a film loop deployed within the interior of said housing supported on a plurality of turning rollers mounted for rotation between said upper and lower surface, selected ones of said rollers being aligned along inclined orientations relative said upper and lower surfaces to extend a selected portion of said film loop subjacent said apertures; and a light admitting opening formed in said housing for illuminating with ambient light said selected portion of said film loop.

8. Apparatus according to claim 7 wherein:

at least one of said turning rollers includes means for manual rotary articulation to advance said film loop.

9. Apparatus according to claim 8 further comprising:

a second viewing aperture formed in said front surface and spaced by an ocular dimension from said first aperture; and said film loop includes paired stereoscopic images separated for alignment with corresponding ones of said apertures.

10. Apparatus according to claim 9 wherein:

said first and second viewing apertures each include a corresponding erectable shield formed thereabout comprising in parts thereof adjacent portions of said upper and lower surface.

11. In an enclosure useful to contain a record medium inscribed with an entertainment sequence, said enclosure being defined by an upper and lower surface and a peripheral wall therebetween cooperatively forming a generally rectangular interior cavity conformed to receive said record medium, the improvement comprising:

said upper and lower surfaces including surface extensions joined by an elongate front surface to cooperatively form a viewer housing therebetween;

a pair of viewing apertures formed in said front surface each said aperture including a corresponding erectable shield formed thereabout comprising in parts thereof adjacent partly severed portions of said upper and lower surface;

a film loop deployed within the interior of said housing supported on a plurality of turning rollers mounted for rotation between said upper and lower surface to extend a selected portion of said film loop subjacent said apertures; and a light admitting opening formed in said housing for illuminating with ambient light said selected portion of said film loop.

12. Apparatus according to claim 11 wherein:

said film loop includes paired stereoscopic images separated for alignment with corresponding ones of said apertures.

13. Apparatus according to claim 12 further comprising:

a mirror formed in said light admitting opening for directing ambient light to said images.

* * * * *